United States Patent
Serres (10) Patent No.: US 7,828,517 B2
(45) Date of Patent: Nov. 9, 2010

(54) VARIABLE-GEOMETRY TURBOCHARGER WITH ASYMMETRIC DIVIDED VOLUTE FOR ENGINE EXHAUST GAS PULSE OPTIMIZATION

(75) Inventor: Nicolas Serres, Epinal (FR)

(73) Assignee: Honeywell International, Inc., Morristown, NJ (US)

( * ) Notice: Subject to any disclaimer, the term of this patent is extended or adjusted under 35 U.S.C. 154(b) by 729 days.

(21) Appl. No.: 11/834,115

(22) Filed: Aug. 6, 2007

(65) Prior Publication Data

US 2009/0041577 A1    Feb. 12, 2009

(51) Int. Cl.
*F01D 1/02* (2006.01)
(52) U.S. Cl. .................. 415/157; 415/184; 415/208.3
(58) Field of Classification Search .......... 415/151, 415/157, 184, 186, 187, 203, 204, 205, 208.1, 415/211.1
See application file for complete search history.

(56) References Cited

U.S. PATENT DOCUMENTS

| | | | |
|---|---|---|---|
| 3,557,549 A * | 1/1971 | Webster | 415/147 |
| 5,092,126 A | 3/1992 | Yano | |
| 5,454,225 A * | 10/1995 | Sumser et al. | 415/166 |
| 6,220,031 B1 | 4/2001 | Daudel et al. | |
| 7,269,950 B2 * | 9/2007 | Pedersen et al. | 60/602 |
| 7,428,814 B2 * | 9/2008 | Pedersen et al. | 415/202 |
| 2006/0042247 A1 * | 3/2006 | Haugen | 60/612 |

* cited by examiner

*Primary Examiner*—Igor Kershteyn
(74) *Attorney, Agent, or Firm*—Alston & Bird LLP (57) ABSTRACT

A turbine assembly for a variable-geometry turbocharger includes a turbine housing defining a divided volute having first and second scrolls, wherein the first scroll has a substantially smaller volume than the second scroll. The first scroll feeds exhaust gas to a first portion of a turbine wheel upstream of the throat of the wheel, while the second scroll feeds gas to a second portion of the wheel at least part of which is downstream of the throat. Flow from the second scroll is regulated by a sliding piston. The first scroll can be optimized for low-flow conditions such that the turbocharger can operate effectively like a small fixed-geometry turbocharger when the piston is closed. The turbine housing defines an inlet that is divided by a dividing wall into two portions respectively feeding gas to the two scrolls, a leading edge of the dividing wall being downstream of the inlet mouth.

12 Claims, 7 Drawing Sheets

VARIABLE-GEOMETRY TURBOCHARGER WITH ASYMMETRIC DIVIDED VOLUTE FOR ENGINE EXHAUST GAS PULSE OPTIMIZATION

FEDERALLY SPONSORED RESEARCH OR DEVELOPMENT

This invention was made with United States Government support under DOE Contract No. DE-FC26-06NT42873 awarded by U.S. Department of Energy. The United States Government has certain rights in the invention.

BACKGROUND OF THE INVENTION

The present disclosure relates generally to exhaust gas-driven turbochargers. More particularly, the disclosure relates to a turbine assembly of a turbocharger for use with an internal combustion engine having two banks of engine cylinders, each bank having engine cylinders exhausting exhaust gas into an exhaust gas discharge line separate from the exhaust gas discharge line for the other bank.

An exhaust gas-driven turbocharger is a device used in conjunction with an internal combustion engine for increasing the power output of the engine by compressing the air that is delivered to the engine's air intake to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is a center housing connected between the turbine and compressor housings for containing bearings for the shaft. The turbine housing defines a generally annular chamber that surrounds the turbine wheel and that receives exhaust gas from the engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Internal combustion engines are not steady-flow devices because each engine cylinder is closed during the compression and combustion/expansion strokes of a full cycle. Thus, the stream of exhaust gas discharged by a given cylinder is actually a series of short bursts or pulses of exhaust gas, each pulse corresponding to the exhaust stroke of a cycle. In engines having multiple cylinders, it is known that it can be advantageous to "gang" the cylinders in two groups or banks, such that the cylinders in one bank exhaust into one exhaust gas discharge line and the cylinders in the other bank exhaust into another separate exhaust gas discharge line. The two lines then feed the exhaust gas to the turbocharger in such a way that the two streams of exhaust gas are kept separate for as long as possible. Such an arrangement can take advantage of the "pulse" effect in the exhaust streams.

In a conventional turbocharger having a single turbine volute, the pulse effect is not optimized, particularly at low gas flow rates, because the two exhaust streams must merge and mix when they enter the turbine housing of the turbocharger. When the exhaust is fed into a single large-volume volute at low flow rates, the pulse energy in the exhaust gas is not efficiently converted into mechanical energy in the turbine.

BRIEF SUMMARY OF THE DISCLOSURE

The present disclosure relates to a turbine assembly for a turbocharger designed to take fuller advantage of the pulse effect in such twin-bank engine exhaust systems. In accordance with one aspect of the disclosure, the turbine assembly includes a turbine housing having a bore extending in an axial direction and having a divided volute or "twin scroll" surrounding the bore for receiving exhaust gas from the exhaust gas discharge lines of the engine. The twin scroll defines a first scroll and a second scroll that is substantially divided and separated from the first scroll, the first scroll being located upstream of the second scroll with respect to an axial flow direction along which exhaust gas flows through the bore of the turbine housing. The first scroll advantageously has a considerably smaller volume than the second scroll. The assembly further includes a turbine wheel rotatably mounted in the bore, the turbine wheel comprising a hub and a plurality of circumferentially spaced blades joined to the hub and extending generally radially outwardly therefrom and terminating in blade tips. The blades define blade passages therebetween, each blade passage having a throat at which a flow area of the blade passage is a minimum. A radial-axial projection of the blade tips defines a contour having a first portion located axially upstream of the throat and a second portion located axially downstream of the first portion, at least part of the second portion being located axially downstream of the throat.

An exhaust gas inlet is defined by the turbine housing for admitting exhaust gas into the first and second scrolls, the exhaust gas inlet being configured to place both the first and second scrolls in fluid communication with both exhaust gas discharge lines from the engine, but still maintaining a substantial division between the two exhaust gas streams as the streams enter and pass through the two scrolls.

The first scroll has an outlet portion configured to direct exhaust gas substantially only to the first portion of the contour of the turbine wheel, and the second scroll has an outlet portion configured to direct exhaust gas substantially only to the second portion of the wheel contour.

In preferred embodiments, the turbine assembly further comprises a variable-geometry mechanism structured and arranged to regulate a flow area leading from the second scroll into the turbine wheel. Advantageously, the variable-geometry mechanism is operable to substantially prevent any flow from the second scroll to the turbine wheel at certain operating conditions in which use of the first scroll alone is adequate. With this arrangement, it is possible to configure the first scroll and its outlet portion to be optimized to function as a fixed-geometry turbo (with or without guide vanes in the first scroll) for low-flow conditions such as at low engine speeds. The second scroll can then be opened via the variable-geometry mechanism when greater flow rates are needed (e.g., at high engine speeds/loads). The substantial division of the two scrolls helps preserve the benefits of the separate exhaust gas streams. At the same time, however, both exhaust gas lines can feed exhaust gas to the first scroll when the second scroll is closed by the variable-geometry mechanism. Using this concept, when the engine is running at low speed such that the exhaust gas flow rate is low, all of the exhaust gas can be fed to the first scroll (by closing the variable-geometry mechanism on the second scroll). The first scroll can be optimized for low-flow conditions, such that the pulse effect in the exhaust gas can be more-efficiently converted into mechanical energy in the turbine, in comparison to a conventional single-volute turbocharger where the exhaust gas passes through a volute of large volume.

In one embodiment, the variable-geometry mechanism comprises a tubular piston disposed in the bore of the turbine housing so as to be axially slidable therein. The turbine housing includes a dividing wall separating the outlet portions of the first and second scrolls that direct exhaust gas into the turbine wheel, and the piston is slidable between a closed position having an upstream end of the piston proximate the dividing wall so as to substantially close the outlet portion of the second scroll, and an open position having the upstream end of the piston spaced from the dividing wall such that substantially a full axial width of the outlet portion of the second scroll is uncovered by the piston.

In one embodiment, a plurality of circumferentially spaced vanes are disposed proximate the outlet portion of the second scroll for guiding exhaust gas into the turbine wheel. The piston and vanes can at least partially overlap in a radial direction, and the piston can include recesses for receiving at least portions of the vanes.

The contour defined by the radial-axial projection of the turbine wheel blade tips, in accordance with one embodiment, includes a concave portion that is concave in a radially outward direction, and the piston has a radially inner surface a portion of which in radial-axial projection is convex in a radially inward direction and which is substantially complementary in shape to the concave portion of the contour.

The first portion of the wheel contour has an axial B-width, and the outlet portion of the first scroll in one embodiment has an axial width substantially equal to the B-width.

In one embodiment, the first scroll is substantially smaller in volume than the second scroll. As one example, the first scroll can have a volume less than half that of the second scroll.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

A variable-geometry turbine assembly 100 for a turbocharger in accordance with one embodiment of the invention is depicted in various views in FIGS. 1-6. The turbine assembly is particularly adapted for use in a turbocharger coupled with an internal combustion engine having two banks of engine cylinders, each bank having engine cylinders discharging exhaust gas into an exhaust gas discharge line separate from the exhaust gas discharge line for the other bank. The turbine assembly includes a turbine housing 110 having a bore 112 extending in an axial direction. The turbine housing defines a divided volute or twin scroll 114 surrounding the bore 112 for receiving exhaust gas from the exhaust gas discharge lines of an engine. The twin scroll defines a first scroll 114a and a second scroll 114b that is substantially divided and separated from the first scroll. Each of the first and second scrolls is a generally annular or toroidal chamber extending circumferentially about the axis of the turbine assembly. The first scroll 114a is located upstream of the second scroll 114b, with respect to an axial flow direction (indicated by arrow 115 in FIG. 1) along which exhaust gas flows through the bore 112 of the turbine housing.

The turbine assembly 100 further comprises a turbine wheel 120 rotatably mounted in the bore 112, the turbine wheel comprising a hub 122 and a plurality of circumferentially spaced blades 124 joined to the hub and extending generally radially outwardly therefrom and terminating in blade tips. The blades 124 define blade passages therebetween, each blade passage having a throat (shown diagrammatically at 126 in FIG. 7) at which a flow area of the blade passage is a minimum. A radial-axial projection of the blade tips defines a contour 128 having a first portion 128a located axially upstream of the throat and a second portion 128b located axially downstream of the first portion, at least part of the second portion 128b being located axially downstream of the throat.

Figure 1:
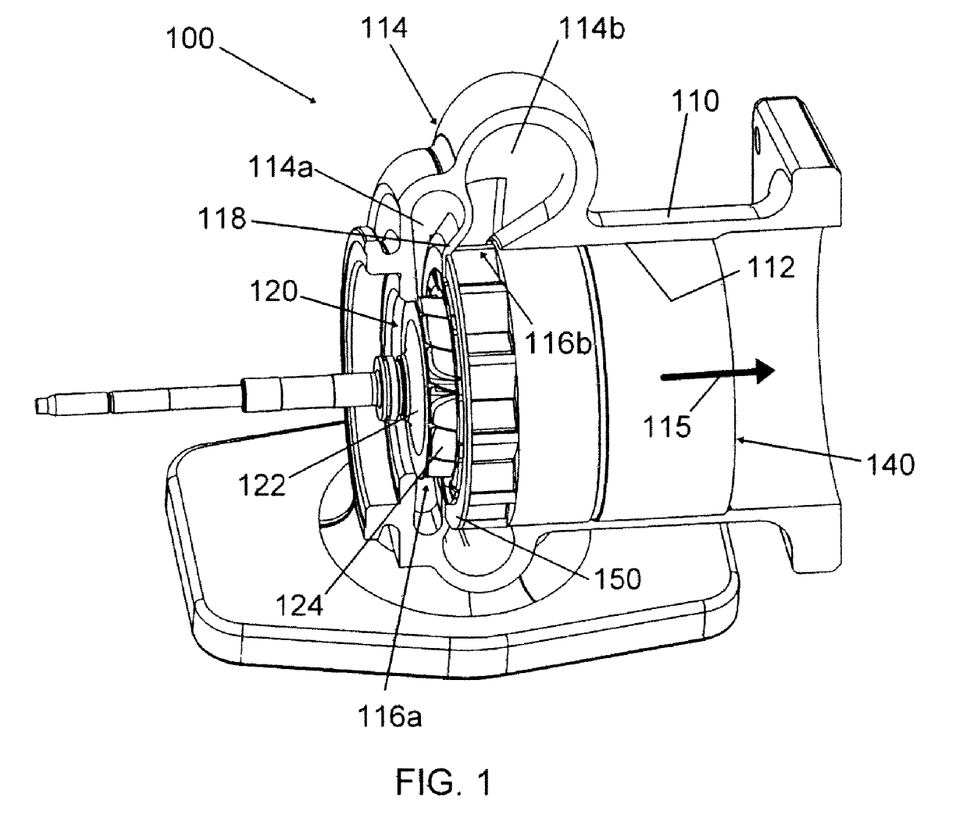
FIG. 1 is a perspective view, partly in section, of a turbine assembly in accordance with one embodiment of the invention, with the piston in a closed position.
Figure 2:
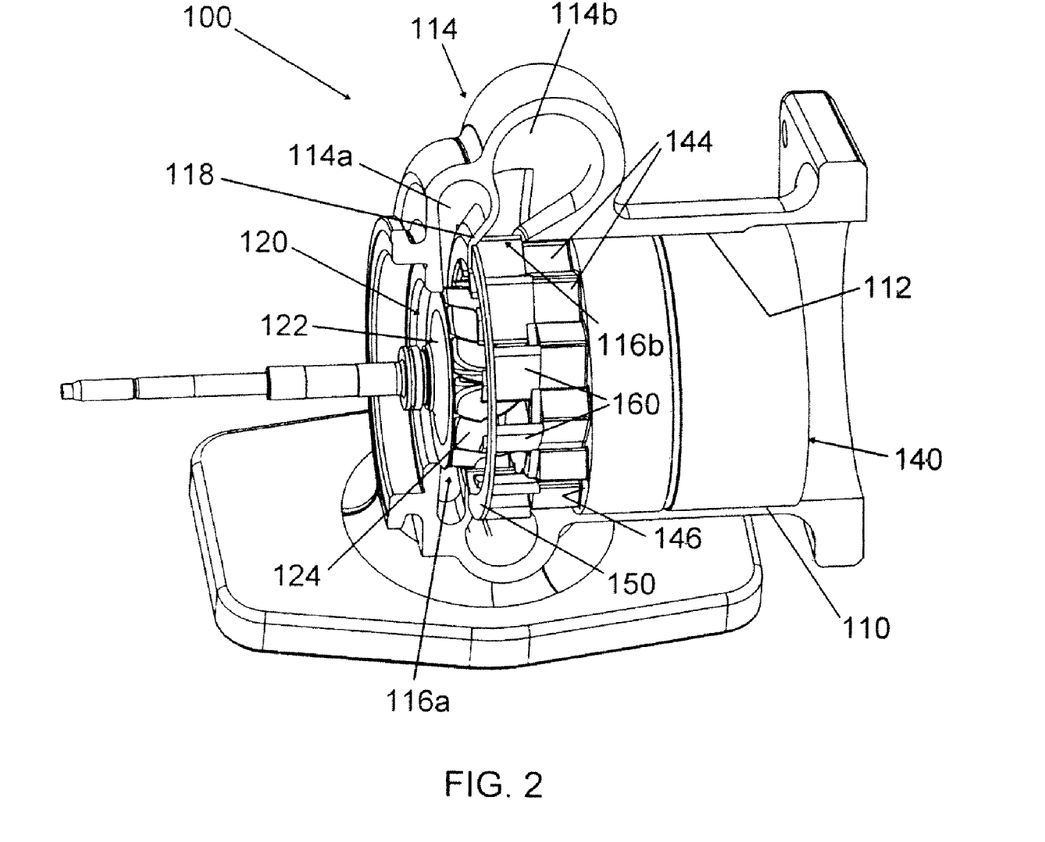
FIG. 2 is a view similar to FIG. 1, with the piston in an open position.
Figure 3:
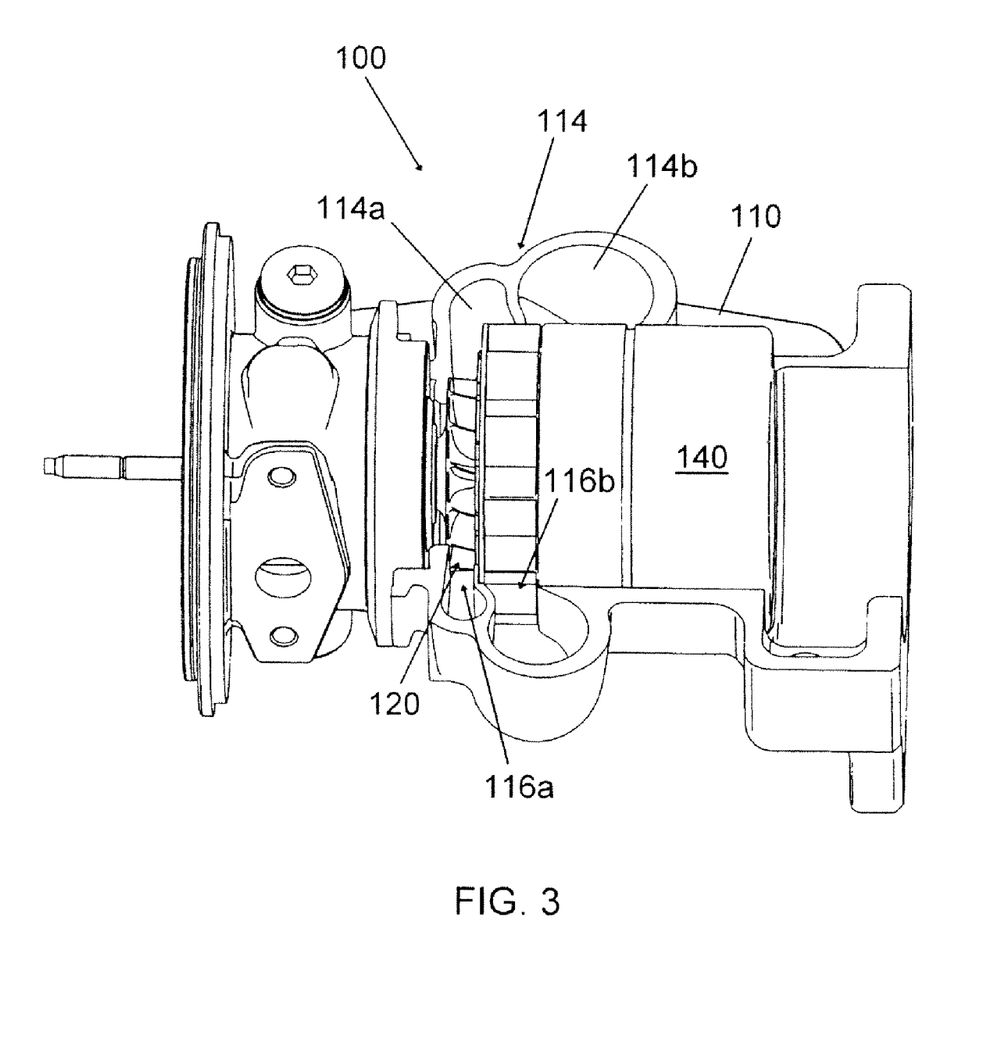
FIG. 3 is a side view of the turbine assembly, partly in section, with the piston in the closed position.
Figure 4:
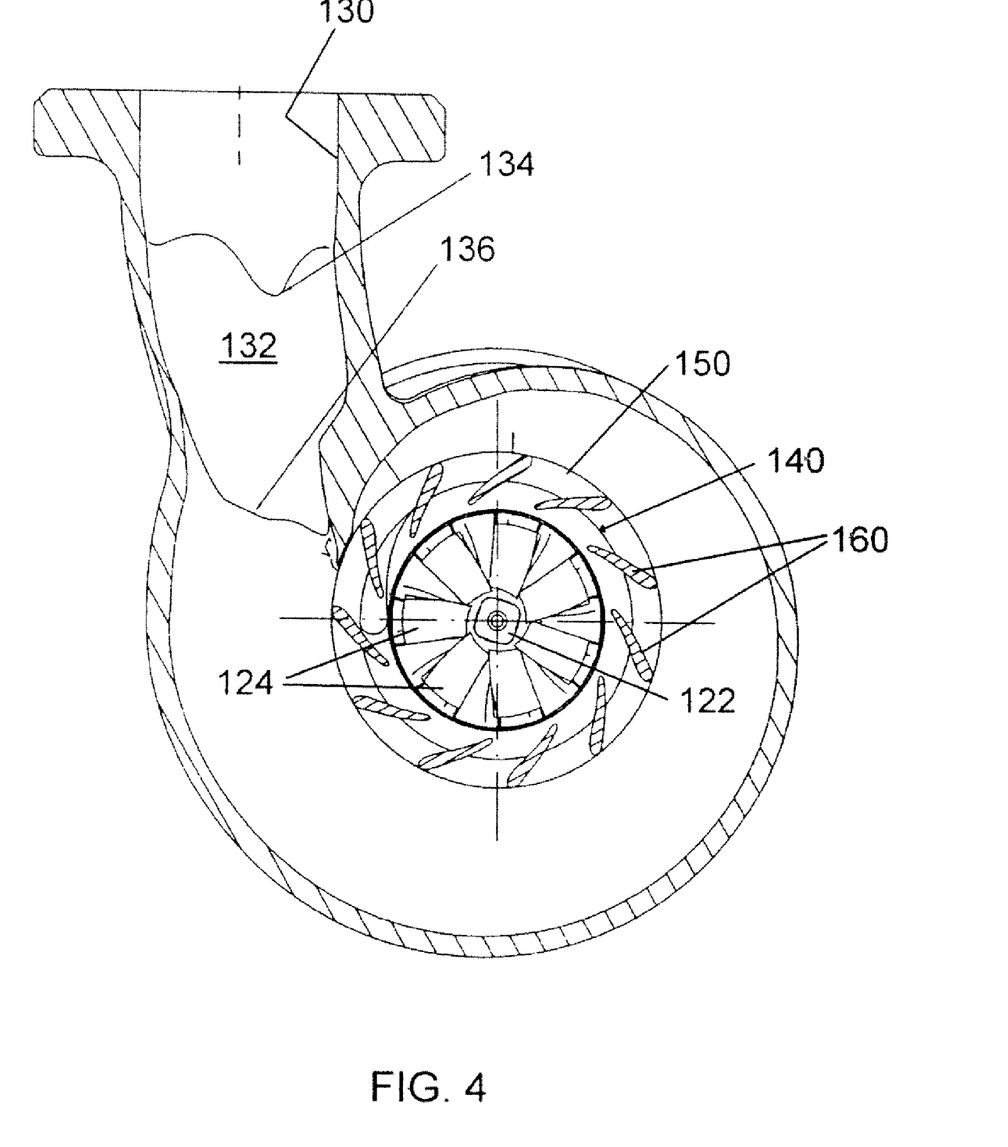
FIG. 4 is an end view, partly sectioned, of the turbine assembly.
Figure 5:
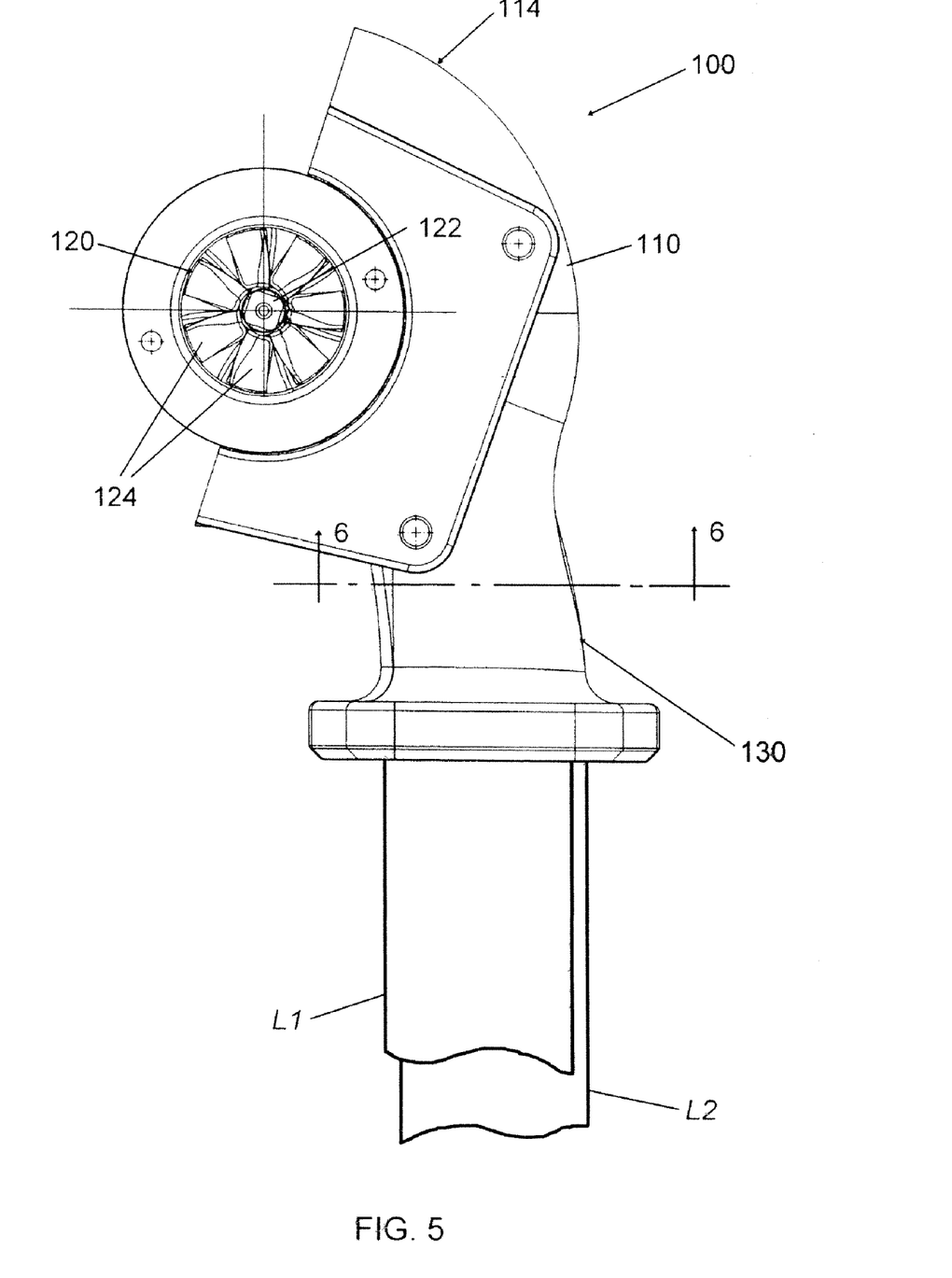
FIG. 5 is a cross-sectional view of the turbine assembly, along a plane perpendicular to the longitudinal axis of the turbine assembly.
Figure 6:
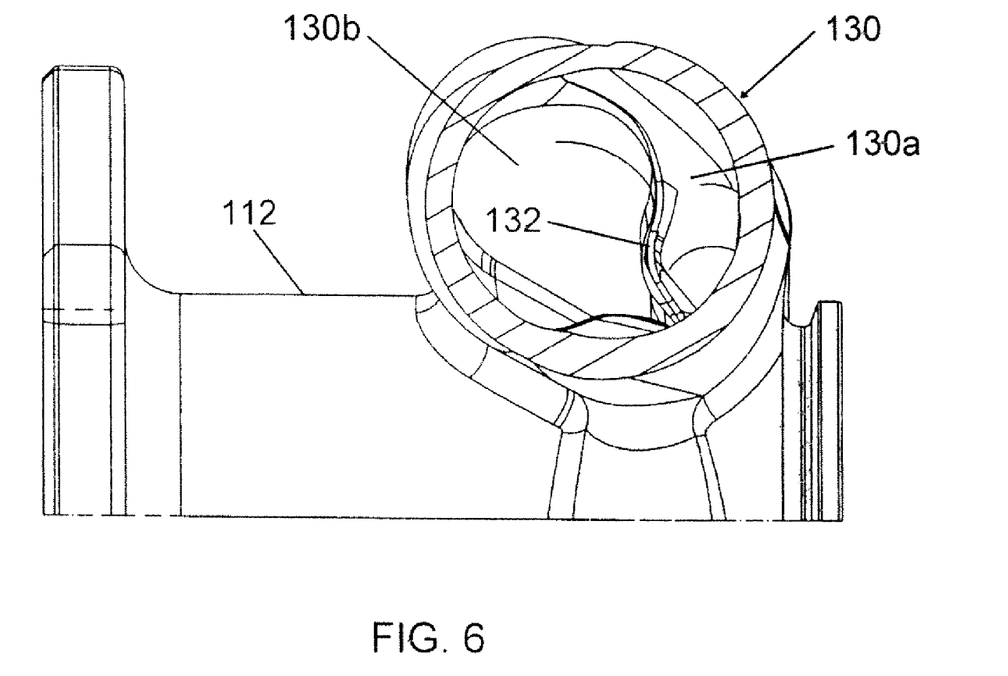
FIG. 6 is a cross-sectional view along line 6-6 in FIG. 4.

With primary reference to FIGS. 4-6, the turbine assembly includes an exhaust gas inlet 130 defined by the turbine housing 110 for feeding exhaust gas into the first and second scrolls 114a, 114b. The exhaust gas inlet is configured to place both the first and second scrolls in fluid communication with two separate exhaust gas discharge lines L1 and L2 from the engine. This is accomplished, for example, by providing a dividing wall 132 that divides the inlet 130 into two portions 130a and 130b (FIG. 6), the portion 130a being arranged for providing exhaust gas primarily to the first scroll 114a, and the second portion 130b being arranged for providing exhaust gas primarily to the second scroll 114b. The leading edge 134 of the dividing wall is spaced in the flow direction from the mouth of the inlet 130, as best seen in FIG. 4. Accordingly, when the two exhaust gas discharge lines are coupled with the inlet 130 so as to feed their separate exhaust gas streams into the mouth of the inlet, it is possible for gas from both lines to flow into a given one of the scrolls 114a, 114b. For instance, as further described below, under some operating conditions the outlet from the second scroll 114b is effectively closed, such that all of the exhaust gas from both discharge lines from the engine must flow through the first scroll 114a. The arrangement of the dividing wall 132, with its leading edge spaced in the flow direction from the mouth of the inlet, allows this to occur. However, when the outlets of both scrolls are open, the exhaust gas streams in the two portions of the inlet 130 feed exhaust gas primarily to the respective scrolls 114a, 114b, without substantial "cross-feeding" or mixing between the two streams (i.e., one of the exhaust streams is fed primarily into the first scroll 114a and the other stream is fed primarily into the second scroll 114b).

The first scroll 114a has an outlet portion 116a configured to direct exhaust gas substantially only to the first portion 128a of the turbine blade contour 128. The second scroll 114b has an outlet portion 116b configured to direct exhaust gas substantially only to the second portion 128b of the contour 128. As a result of this arrangement, when exhaust gas enters the turbine wheel 120 from only the first scroll 114a, the turbocharger can function as a fixed-geometry turbocharger, and the first scroll's geometry can be optimized for low-flow conditions in which flow from only the first scroll is adequate to meet the demand for engine boost from the turbocharger. In some embodiments, the first scroll is substantially smaller in volume than the second scroll. For example, the first scroll can have a volume less than half that of the second scroll.

At other operating conditions having higher exhaust gas flow rates, it is necessary that both scrolls 114a, 114b feed gas to the turbine wheel. The turbine assembly 100 includes a variable-nozzle mechanism for regulating flow from the second scroll 114b. The variable-nozzle mechanism can be of any known type, but preferably should be of a type allowing the second scroll's outlet 116b to be effectively completely closed (except for possible slight leakage flow) during certain operating conditions, to be fully opened to allow substantially unrestricted flow from the outlet 116b at other operating conditions, and to be partially opened in varying degrees at still other operating conditions. Movable vanes or sliding pistons can be employed for this purpose. In the illustrated embodiment, the mechanism comprises a generally tubular piston 140 disposed in the bore 112 of the turbine housing such that the piston is axially slidable in the bore. Such sliding pistons in themselves are known, and thus the piston 140 does not require detailed description herein, except to note aspects of the piston of particular significance to the present turbine assembly.

In this regard, the turbine assembly includes fixed vanes 160 mounted on a generally annular ring 150. The ring 150 with the vanes 160 is mounted in the turbine housing such that the ring 150 abuts a wall 118 that divides the outlet 116a of the first scroll 114a from the outlet 116b of the second scroll 114b. The vanes 160 are arranged in an annular array circumferentially spaced apart about the circumference of the ring 150. The vanes extend axially away from the ring 150 generally parallel to the downstream direction 115 (FIG. 1), toward an opposite wall of the turbine housing, and thus extend across the outlet portion 116b of the second scroll 114b. The vanes 160 serve to guide the exhaust gas into the second portion 128b of the turbine wheel contour in an advantageous direction. The upstream end portion of the piston 140 includes slots or recesses 144 in its radially outer surface. Each recess 144 receives a radially inward portion of one vane 160 when the piston is in its closed or partially open positions, as best seen in FIG. 4. In other words, the piston 140 and vanes 160 partially overlap in the radial direction. When the piston is fully closed as in FIG. 1, the free ends of the vanes 160 abut or nearly abut an axially facing surface 146 (FIGS. 2, 6, and 7) of the piston. When the piston is fully open, the upstream end of the piston is spaced from the dividing wall 118 and ring 150 such that substantially a full axial width of the outlet portion 116b of the second scroll 114b is uncovered by the piston. Flow of exhaust gas from the second scroll 114b into the turbine wheel thus can be regulated by adjusting the axial position of the piston 140, which can be accomplished as a function of one or more operating parameters such as engine speed, demanded load, etc.

Figure 7:
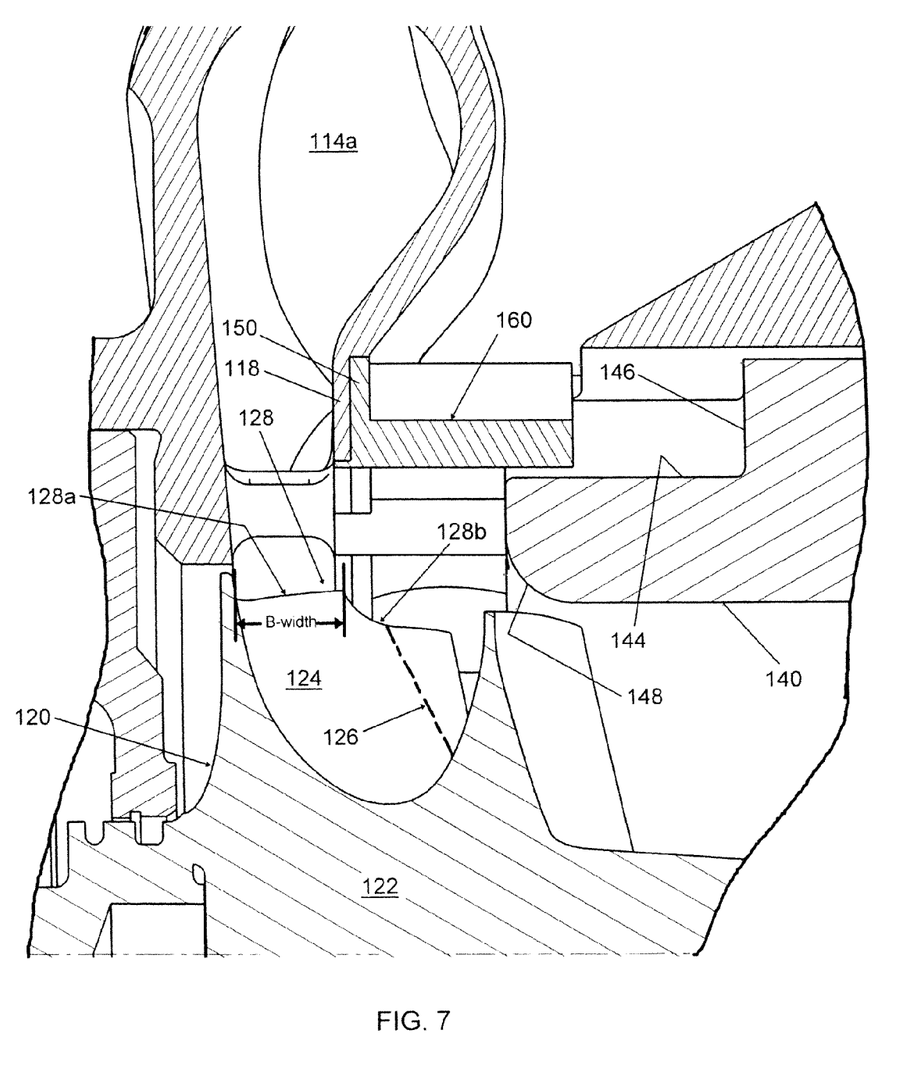
FIG. 7 is an axial cross-sectional view of the turbine assembly, with the piston open.

With reference to FIG. 7, in some embodiments of the invention, the contour 128 of the turbine wheel includes a concave portion that is concave in a radially outward direction, and the piston 140 has a radially inner surface a portion 148 of which in radial-axial projection is convex in a radially inward direction and which is substantially complementary in shape to the concave portion of the contour. Shaping the piston in this way helps to guide the flow of exhaust gas in a desirable direction as the piston just begins to open from its fully closed position.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbine assembly of a turbocharger for use with an internal combustion engine having two banks of engine cylinders, each bank having multiple engine cylinders exhausting exhaust gas into an exhaust gas discharge line separate from the exhaust gas discharge line for the other bank, the turbine assembly comprising:

a turbine housing having a bore extending in an axial direction and having a twin scroll surrounding the bore for receiving exhaust gas from the exhaust gas discharge lines of the engine, the twin scroll defining a first scroll and a second scroll that is substantially divided and separated from the first scroll, the first scroll located upstream of the second scroll with respect to an axial flow direction along which exhaust gas flows through the bore of the turbine housing;

a turbine wheel rotatably mounted in the bore, the turbine wheel comprising a hub and a plurality of circumferentially spaced blades joined to the hub and extending generally radially outwardly therefrom and terminating in blade tips, the blades defining blade passages therebetween, each blade passage having a throat at which a flow area of the blade passage is a minimum, a radial-axial projection of the blade tips defining a contour having a first portion located axially upstream of the throat and a second portion located axially downstream of the first portion, at least part of the second portion being located axially downstream of the throat;

an exhaust gas inlet defined by the turbine housing for admitting exhaust gas into the first and second scrolls, the exhaust gas inlet being configured to place both the first and second scrolls in fluid communication with both exhaust gas discharge lines from the engine;

the first scroll having an outlet portion configured to direct exhaust gas substantially only to the first portion of the contour; and the second scroll having an outlet portion configured to direct exhaust gas substantially only to the second portion of the contour.

2. The turbine assembly of claim 1, wherein the first portion of the contour has an axial B-width, and the outlet portion of the first scroll that directs exhaust gas to the turbine wheel has an axial width substantially equal to the B-width.

3. The turbine assembly of claim 1, wherein the first scroll is free of guide vanes.

4. The turbine assembly of claim 1, wherein the first scroll is substantially smaller in volume than the second scroll.

5. The turbine assembly of claim 4, wherein the first scroll has a volume less than half that of the second scroll.

6. The turbine assembly of claim 1, further comprising a variable-geometry mechanism structured and arranged to regulate a flow area leading from the second scroll into the turbine wheel.

7. The turbine assembly of claim 6, wherein the variable-geometry mechanism is operable to substantially prevent any flow from the second scroll to the turbine wheel under operating conditions in which use of the first scroll alone is adequate.

8. The turbine assembly of claim 6, wherein the variable-geometry mechanism comprises a tubular piston disposed in the bore of the turbine housing so as to be axially slidable therein, the turbine housing including a dividing wall separating the portions of the first and second scrolls that direct exhaust gas into the turbine wheel, and the piston being ridable between a closed position having an upstream end of the piston proximate the dividing wall so as to substantially close the outlet portion of the second scroll, and an open position having the upstream end of the piston spaced from the dividing wall such that substantially a full axial width of the outlet portion of the second scroll is uncovered by the piston.

9. The turbine assembly of claim 8, further comprising a plurality of circumferentially spaced vanes disposed proximate the outlet portion of the second scroll for guiding exhaust gas into the turbine wheel.

10. The turbine assembly of claim 9, the piston and vanes at least partially overlapping in a radial direction, the piston including recesses for receiving at least portions of the vanes.

11. The turbine assembly of claim 8, wherein the contour includes a concave portion that is concave in a radially outward direction, and the piston has a radially inner surface a portion of which in radial-axial projection is convex in a radially inward direction and which is substantially complementary in shape to the concave portion of the contour.

12. The turbine assembly of claim 1, wherein the turbine housing defines an inlet for receiving exhaust gas from the exhaust gas discharge lines of the engine and directing the exhaust gas along a flow direction into the first and second scrolls, the inlet having a dividing wall that divides a lengthwise portion of the inlet into first and second portions, the dividing wall having a leading edge spaced in the flow direction from a mouth of the inlet.

* * * * *